US012172141B2

(12) United States Patent
Lam

(10) Patent No.: US 12,172,141 B2
(45) Date of Patent: Dec. 24, 2024

(54) POWDERED COSMETIC DISPENSING SYSTEM

(71) Applicant: L'OREAL, Paris (FR)

(72) Inventor: Eric Wing-Jing Lam, San Francisco, CA (US)

(73) Assignee: L'Oreal, Paris (FR)

(*) Notice: Subject to any disclaimer, the term of this patent is extended or adjusted under 35 U.S.C. 154(b) by 621 days.

(21) Appl. No.: 17/462,500

(22) Filed: Aug. 31, 2021

(65) Prior Publication Data

US 2022/0062839 A1 Mar. 3, 2022

Related U.S. Application Data

(60) Provisional application No. 63/072,663, filed on Aug. 31, 2020.

(30) Foreign Application Priority Data

Nov. 23, 2020 (FR) ....................................... 2012000

(51) Int. Cl.

| | |
|---|---|
| ***B01F 33/84*** | (2022.01) |
| ***A45D 33/14*** | (2006.01) |
| ***B01F 35/22*** | (2022.01) |
| ***B01F 101/21*** | (2022.01) |

(52) U.S. Cl.

CPC .......... *B01F 33/8442* (2022.01); *A45D 33/14* (2013.01); *B01F 35/2207* (2022.01); *A45D 2200/056* (2013.01); *B01F 2101/21* (2022.01)

(58) Field of Classification Search

CPC .............. B01F 33/8442; B01F 35/2207; B01F 2101/21; A45D 33/14; A45D 2200/056; A45D 33/003

See application file for complete search history.

(56) References Cited

U.S. PATENT DOCUMENTS 6,793,387 B1 * 9/2004 Neas ..................... B01F 33/841 222/106
8,047,214 B2 * 11/2011 Thorpe .................. A45D 33/02 132/299

(Continued)

FOREIGN PATENT DOCUMENTS

WO WO 2006/052863 A1 5/2006
WO WO 2014/066721 A2 5/2014
WO WO 2017/006018 A1 1/2017

OTHER PUBLICATIONS

Written Opinion and Preliminary Search Report mailed Jul. 20, 2021 in French Application No. 2012000.

*Primary Examiner* — Michael Collins
(74) *Attorney, Agent, or Firm* — CHRISTENSON O'CONNOR JOHNSON KINDNESS PLLC

(57) ABSTRACT

An apparatus is provided for dispensing a powdered cosmetic composition, including a dispenser holder configured to hold at least one dispenser that stores a cosmetic composition that is used to make a powdered cosmetic composition; a container receiving area configured to hold a output container beneath the at least one dispenser; and circuitry configured to determine the cosmetic composition in the at least one dispenser, control the output container to be moved beneath the at least one dispenser, and control the dispenser to dispense the cosmetic composition into the output container.

13 Claims, 21 Drawing Sheets

(56) References Cited

U.S. PATENT DOCUMENTS

| | | | | |
|---|---|---|---|---|
| 8,123,426 | B2 * | 2/2012 | Byun | B65D 35/38 401/206 |
| 10,182,635 | B2 * | 1/2019 | Lee | A45D 34/00 |
| 2002/0194021 | A1 * | 12/2002 | Matsumoto | B01F 33/8442 705/2 |
| 2011/0011490 | A1 * | 1/2011 | Rodrigues | B01F 33/848 141/69 |
| 2012/0152406 | A1 * | 6/2012 | Bartholomew | B65B 3/04 141/104 |
| 2013/0255831 | A1 * | 10/2013 | Shibasaki | B01F 33/846 141/69 |
| 2016/0051029 | A1 * | 2/2016 | Lee | B01F 35/7137 53/51 |
| 2017/0224090 | A1 | 8/2017 | Lam et al. | |
| 2018/0215488 | A1 * | 8/2018 | Sebastian | B65D 50/00 |

* cited by examiner

POWDERED COSMETIC DISPENSING SYSTEM

CROSS-REFERENCE TO RELATED APPLICATIONS

This application claims the benefit of priority from U.S. Provisional Application No. 63/072,663 filed Aug. 31, 2020, and claims the benefit of priority from French Application No. FR 2012000 filed Nov. 23, 2020, the entire contents of each of which are incorporated herein by reference.

BACKGROUND

Field

The disclosure herein generally relates to a system, method and apparatus for dispensing powdered cosmetics for a particular user.

SUMMARY

In an embodiment, an apparatus is provided for dispensing a powdered cosmetic composition, including: a dispenser holder configured to hold at least one dispenser that stores a cosmetic composition that is used to make a powdered cosmetic composition; a container receiving area configured to hold a output container beneath the at least one dispenser; and circuitry configured to determine the cosmetic composition in the at least one dispenser, control the output container to be moved beneath the at least one dispenser, and control the dispenser to dispense the cosmetic composition into the output container.

In an embodiment, a mixer is provided that is configured to subject the output container to a predetermined movement to cause contents of the output container to mix together.

In an embodiment, the dispenser holder is configured to hold a plurality of dispensers, each containing a different cosmetic composition.

In an embodiment, the circuitry is configured to control the output container to be moved one-by-one underneath each of the plurality of dispensers to separately dispense a respective amount of each respective different cosmetic composition into the output container.

In an embodiment, the circuitry is configured to determine the respective amount of each of the different cosmetic compositions from the multiple dispensers to dispense into the output container based on received external information regarding a particular user.

In an embodiment, the powdered cosmetic composition is eyeshadow.

In an embodiment, the at least one dispenser includes a mixture of solid and liquid ingredients.

In an embodiment, the at least one dispenser is a syringe pump.

In an embodiment, the at least one dispenser is a screw pump.

In an embodiment, an output drawer is provided that is configured to receive multiple output containers having the powdered cosmetic composition and to hold the output containers external to a housing of the apparatus.

In an embodiment, a compression piston is provided that is configured to compress a cosmetic sponge into the output container after the dispensing operation is performed.

In an embodiment, a two-axis stage is provided to move the output container under the at least one dispenser, wherein the plurality of dispensers are disposed in a row.

In an embodiment, the plurality of dispensers are disposed radially around a center position of the apparatus.

In an embodiment, a system is provided providing a cosmetic composition to a user, including: an apparatus configured to dispense at least one powdered cosmetic composition into a output container; a user interface configured to receive information about the user; and circuitry configured to receive the information about the user and determine one or more cosmetic compositions to be dispensed into the output container based on the information about the user received at the user interface.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein.

DETAILED DESCRIPTION OF THE EMBODIMENTS

Currently, eyeshadows operate on traditional cosmetic distribution models where each line develops several color options to cover the addressable market. This requires the retail space to stock every option, creating the situation where the space may run out of a popular option due to limited inventory space.

The eyeshadow printer according to the following embodiments alleviates this situation by creating the colors onsite, simplifying the distribution channels as well as increasing the options for consumers by offering custom colors.

Previous attempts at eyeshadow printing consisted using a modified off-the-shelf inkjet printer (HP Officejet Pro 8100) using custom ink cartridge filled with food-safe dyes to print on eyeshadow base (talc, magnesium stearate, nylon-12, etc.). While capable of printing color onto eyeshadow base, there were several drawbacks of using dyes to color the base:

- Penetration of dye into base is limited. Printing dye on top of base has a very low penetration depth. H. Samain and F. Giron demonstrated that by modifying the base formula, it is possible to have significant penetration into the base (up to 2 mm) with substantial (50+) layers printed. This also affects the homogeneity of the final product without significant optimization.
- Dyes are not typically used in eyeshadow. Eyeshadows typically use mica and pigment (colorants) to prevent absorption of colorants into skin. Eyeshadows made with printed dyes had a tendency to stain the skin and made the product difficult to remove.
- Standard pigments are too large for inkjet printers. Pigment particles are >2 μm to prevent absorption into the skin. Inkjet printers have difficulty with particulates less than 200 nm. This effectively means that the standard pigments used in eyeshadows cannot be dosed using inkjet technologies.

Figure 1:
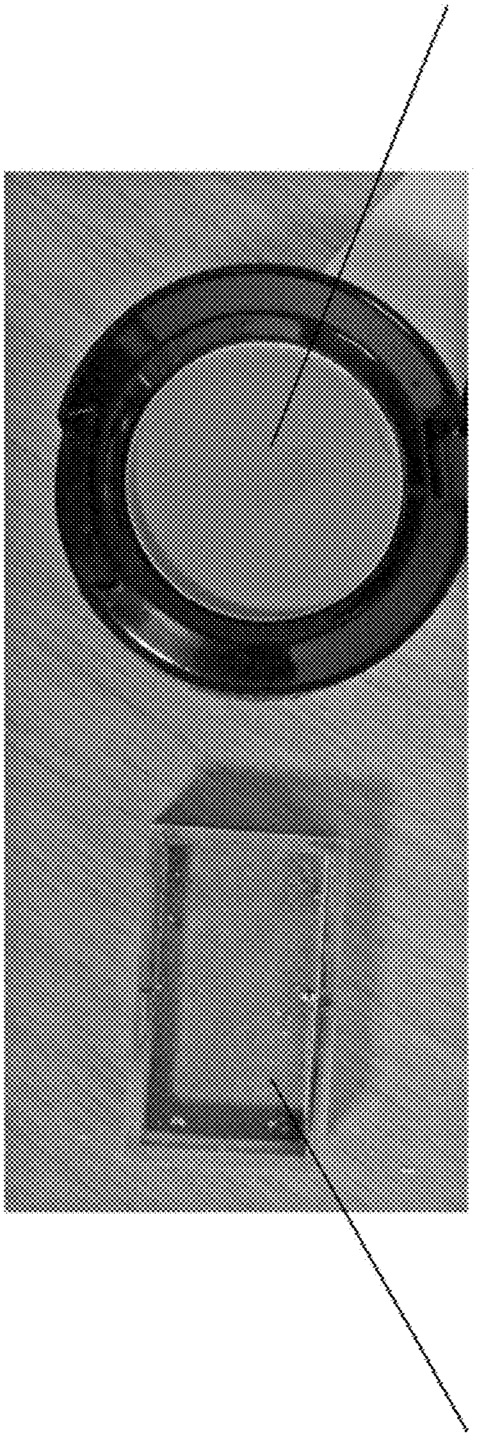
FIG. 1 shows an example printed versus conventional manufactured eyeshadow.
Figure 2:
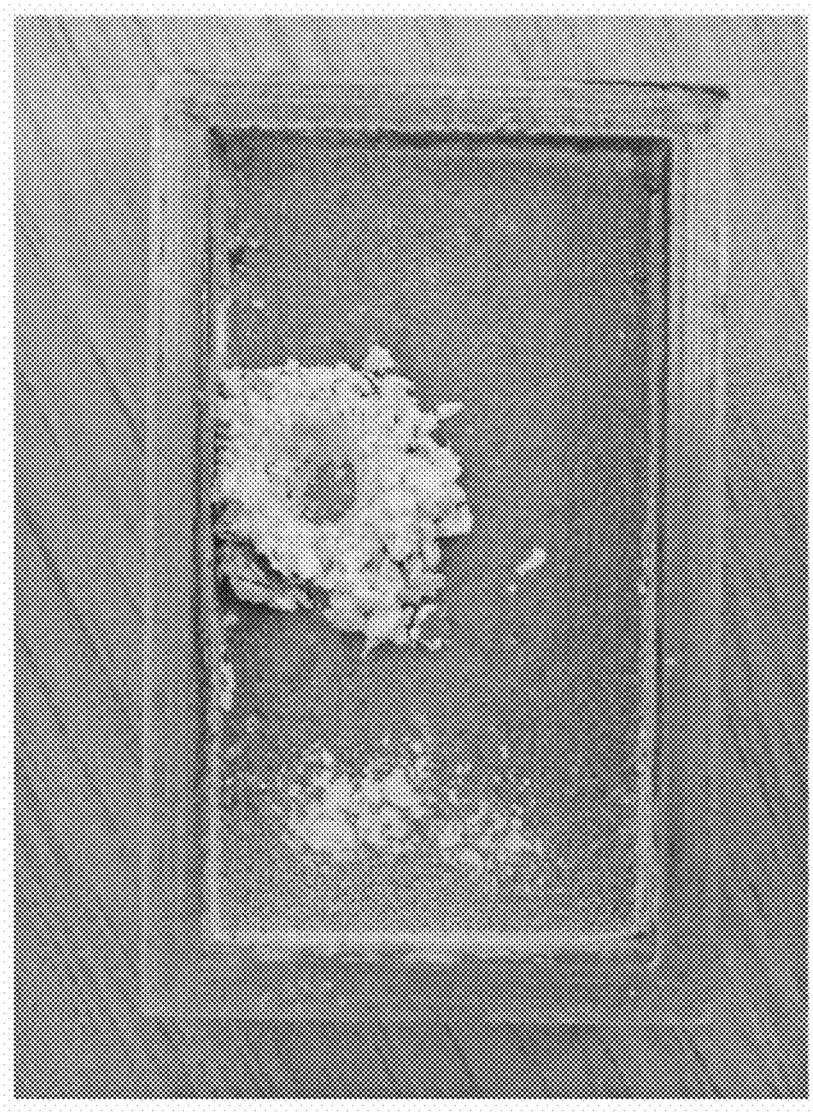
FIG. 2 shows a demonstration of poor dye penetration.
Figure 3:
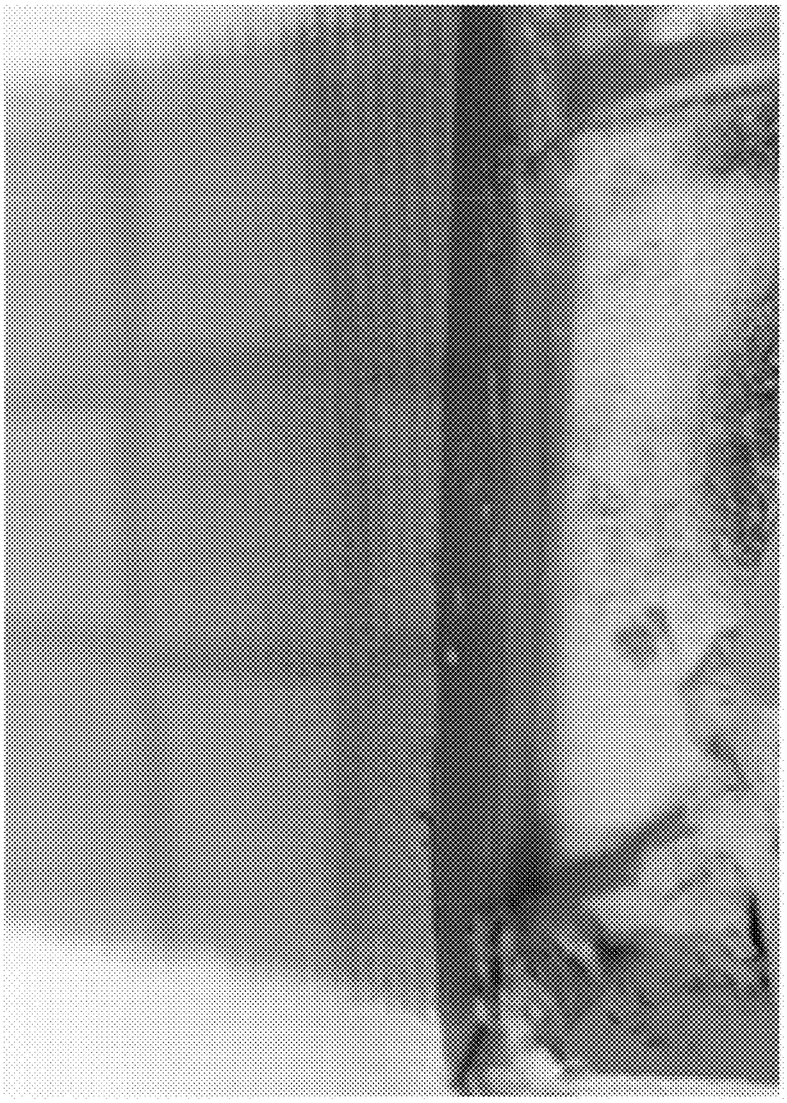
FIG. 3 shows a modified base w/improved dye penetration.

Regarding the above discussion, FIG. 1 shows Printed (101) versus conventional (102) manufactured eyeshadow. FIG. 2 shows a demonstration of poor dye penetration; and FIG. 3 shows Samain & Giron's modified base w/improved penetration It was concluded from these results that while inkjet was feasible for realizing a personalized eyeshadow printer, it was not the optimal delivery mechanism. Should inkjet be utilized as the delivery mechanism, additional procedures such as capillary-assisted penetration as shown in FIG. 4 (where excess liquid and removal of said liquid assists with distributing the colorants) and mixing mechanisms were proposed.

Figure 4:
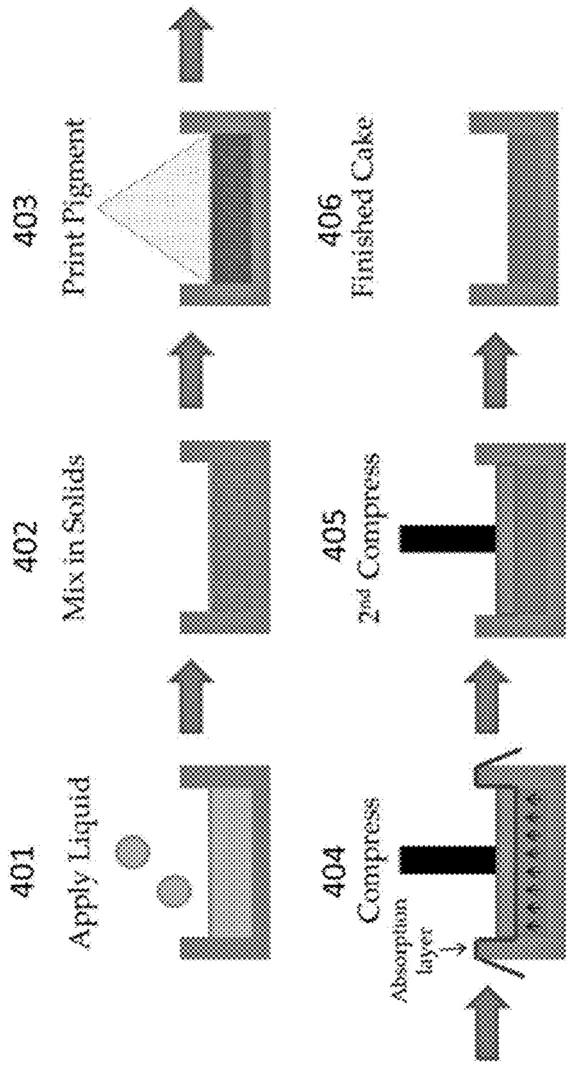
FIG. 4 shows a process of for producing a printed eyeshadow that involves capillary-assisted penetration.

FIG. 4 shows a process that includes applying liquid to a reservoir (401), mixing in the solid ingredients (402), adding in the colored pigment using inkjet (403), applying an absorption layer and performing a first compression step (404), applying a second compression step without the absorption layer (405), to produce the finished cake (406).

It is noted that in the process depicted in FIG. 4, a substantial portion of the eyeshadow prep was still manual, only the dye printing portion was automated. Therefore, the development of automation around the dispensing and compaction of the eyeshadow components was developed. In addition to the development of the auxiliary modules, new dosing and mixing mechanism were explored to improve and realize the concept in FIG. 5.

FIGS. 1A-1B are a top view and a cross sectional view of an apparatus 1000 to realize a personalized cosmetic composition 200, respectively, according to certain aspects of the disclosure.

The apparatus 1000 to realize the personalized cosmetic composition 200 includes a dispenser 1100, a base container 1200, a scraper 1300, a collection container 1400, and a compacter 1450.

The dispenser 1100 dispenses a treatment mixture 210 from a main reservoir 1110 onto a base 220 (e.g., a cosmetic base, a makeup base, a powder base, a talc base, and the like) contained in the base container 1200. The treatment mixture 210 is dispensed on the base 220 to create a treated base 230. The scraper 1300 collects the treated base 230 from the base container 1200 and transports the treated base 230 onto the collection container 1400.

Once a predetermined quantity of treated base 230 has accumulated in the collection container 1400, the compressing mechanism 1450 compresses a predetermined quantity of treated base 230 to form a cake 240 inside the collection container 1400. The collection container 1400 and the cake 240 inside form the personalized cosmetic composition 200 that can be delivered to a user.

The dispenser 1100 may include the main reservoir 1110, a dispensing head 1130 that dispenses the treatment mixture 210, and a plurality of conduits 1124 that joins the main reservoir 1110 to the dispensing head 1130.

The main reservoir 1110 may include a plurality of independent reservoirs 1120 that contains a plurality of additives 250. The plurality of additives 250 may be used to elaborate the treatment mixture 210 by blending a selection of additives from the plurality of additives 250.

The plurality of additives 250 may include a plurality of compounds with specific chemical and/or physical characteristics to enhance in a personalized way the appearance and/or scent of the user. The plurality of additives 250 may include liquid binders each containing a different pigment, fragrant essential oils with different scents, different beneficial ingredients, e.g. different serums and/or skin care active ingredients.

For example, the plurality of liquid binders may include a cyan binder 250C with a cyan pigment, a magenta binder 250M with a magenta pigment, a yellow binder 250Y with a yellow pigment, and a black binder 250K with a black pigment.

The selection of additives to compose the treatment mixture 210 may be selected manually via the user, automatically via software instruction performed by circuitry 3000 or the combination thereof.

The base 220 may contain fillers that can be penetrated and/or colored by the plurality of additives 250 that may be dispensed by the dispenser 1100. For example, the base 220 may be a white powder containing talc, stearic acid or/and silicon.

The dispensing head 1130 may be any kind of device configured to blend the selection of additives together to form the treatment mixture 210 and to uniformly dispense the treatment mixture 210 onto the base 220.

For example, the dispenser 1100 may be an inkjet printing system, as described in at least one of U.S. Pat. No. 6,942,324 B2 and in U.S. Pat. No. 6,938,993 B2 each of which is herein incorporated by reference.

In other alternative examples, the dispenser 1100 may be an injection valve an atomizer, or an aerosolizer configured to spread the treatment mixture 210 onto the base container 1200 through successive doses that may be less than 10 micro-liters.

The base container 1200 may include a base chamber 1230 with a base opening 1210 that faces the dispensing head 1130 and a feeder 1220 that pushes the base 220 contained inside the chamber 1230 through the base opening 1210.

The feeder 1220 may include a feeder piston 1222 inserted into the base chamber 1230 with an internal surface 1222 *i* facing the base opening 1210 and in contact with the base 220. The feeder piston 1222 may be displaced along the base chamber 1230 via a feeder actuator 1240.

The feeder actuator 1240 may include a stepper motor 1242 that rotates and screws a precision screw 1244 through a fixed threaded bushing 1246. The precision screw 1244 may have a first end with a ball bearing 1248 in contact with an external surface 1222 *e* of the feeder piston 1222. The external surface 1222 *e* may further include a seat 1224 to receive the ball bearing 1248.

The fixed threaded bushing 1246 that may be positioned below the feeder piston 1222 and pressed fit inside a hole of a support plate 1250 affixed to the base chamber 1230. The precision screw 1244 may have a second end connected to the stepper motor 1242 via a gear box 1243, wherein the stepper motor 1242 may be located below the support plate 1250. The stepper motor 1242 rotates the precision screw 1244, the precision screw 1244 screws inside the fixed threaded bushing 1246 and is displaced vertically to push the feeder piston 1222. The displacement of feeder piston 1222 by the precision screw 1244 may be facilitated by the ball bearing 1248 that is affixed to the external surface 1222 *e* of the feeder piston 1222.

The stepper motor 1242, the precision screw 1244, and the fixed threaded bushing 1246 may be configured to displace the feeder piston 1222 by a predetermined incremental distance Id, e.g. 10 microns.

For example, the stepper motor 1242 may be a position-control DC motor with a 0.007° incremental step, e.g. catalogue number 6627T3 from McMaster-Carr®, the precision screw 1244 and the fixed threaded bushing 1246 may have 100 TPI, e.g. catalogue numbers 97424A230 and 98625A350 from McMaster-Carr®, respectively.

Alternatively, the feeder actuator 1240 may rely on piezo motorized motor configured to displace the feeder piston 1222 by the predetermined incremental distance Id, such as the N-470 PiezoMike Linear Actuator from Physik Instrumente®.

In other alternative example, the feeder actuator 1240 may be mechanical, hydraulic, electrical, or pneumatic. For example, the feeder actuator 1240 may include a ball screw, a solenoid, hydraulic cylinder, pneumatic cylinder, or a combination thereof to push the feeder piston 1222 inside the base chamber 1230. Further, the feeder actuator 1240 may be manually controlled or automatically controlled via software instructions performed by the circuitry 3000. The feeder actuator 1240 may be displaced in a vertical direction, and may be connected to a linkage system.

The scraper 1300 may include a bed 1310 and a blade 1320 moveable on the bed 1310 to collect the treated base 230 and to transport the treated base 230 from the base container 1200 to the collection container 1400.

The bed 1310 may include a first end 1312, a second end 1314 connected to the collection container 1400, a first opening 1316 substantially close to the first end 1312, and a second opening 1318 substantially close to the second end 1314. The first opening 1316 faces the base opening 1210 of the base chamber 1230 while the second opening 1318 is configured to receive the collection container 1400.

The blade 1320 may be a plate flush with the bed 1310 and moveable from a first position to a second position and vice-versa via a scraper actuator 1340. In the first position the blade 1320 is positioned between the first end 1312 and the opening 1312 of the bed 1310, while in the second position the blade 1320 is positioned between the collection container 1400 and the second end 1314 of the bed 1310.

The scraper actuator 1340 may provide a longitudinal translation along an axis parallel to the bed 1310. For example, the scraper actuator 1340 may include a pair of rails 1342 and an electrical motor 1344 to linearly drive the blade 1320 along the pair of rails 1342.

The pair of rails 1342 may be spaced apart, parallel to each other and longitudinally extends from the first end 1312 to the second end 1314 of the bed 1310. The blade 1320 may be placed transversely between the pair of rails 1342 and be affixed to the motor 1344 that travels along the pair of rails 1342. In addition, the pair of rails 1342 is positioned and sufficiently spaced apart to have the blade 1320 totally covering the opening 1316 as well as the collection container 1400.

In an alternative aspect of the disclosure, the scraper actuator 1340 may be configured to displace the blade 1320 from the first position to the second position via a circular motion through a rotation around a shaft placed perpendicular to the bed 1310.

In another alternative aspect of the disclosure, the scraper actuator 1340 may be mechanical, hydraulic, electrical, or pneumatic. For example, the scraper actuator 1340 may include a rack and pinion system, a solenoid, a hydraulic cylinder, a pneumatic cylinder, or a combination thereof to move the blade 1320 from the first position to the second position and vice-versa. Further, the scraper actuator 1340 may be manually controlled or automatically controlled by software instructions performed by the circuitry 3000.

In another alternative aspect of the disclosure, the blade 1320 and the scraper actuator 1340 may be replaced by a nozzle and blowing system that blows the treated base 230 from the base opening 1210 to the collection container 1400. Additionally, and the scraper actuator 1340 may be replaced by a conveyor belt placed on top of the bed 1310 and actuated by a plurality of rollers.

In another alternative aspect of the disclosure, the blade 1320 and/or the bed 1310 may include asperities to enhance the mixing between the treatment mixture 210 and the base 220 while the treated base 230 is displaced from the first position to the second position. The asperities may be ridges, grooves or tongues forming geometrical patterns such as herringbones.

The collection container 1400 may include a mouth 1412, a closed bottom 1414 and a collection chamber 1410 that receives the treated base 230 carried by the feeder 1220.

The collection container 1400 may be configured to be detachable from the second end 1314 of the bed 1310 in order for the user to carry the cake 240 inside the collection container 1400. In addition, the mouth 1412 may be configured to receive a lid to close the collection container 1400 and facilitate the transportation of the personalized cosmetic composition 200.

The compacter 1450 may include a compacter piston 1452, a rod 1458, a lever 1456, a base support 1455 to provide support to the collection container 1400, and a compacter actuator 1454. The compacter piston 1452 may include a lower surface 14521 facing the collection container 1400 and an upper surface 1452 *u* affixed to the rod 1458. The lever 1456 may include a first extremity 1456 *a* connected to the upper surface 1452 *u* through the rod 1458 and a second extremity 1456 *b* connected to the compacter actuator 1454.

The compacter 1450 may be configured to induce a predetermined compacting load on the treated based 230 contained in the collection chamber 1410 and form the cake 240. The compacter 1450 may displace the compacter piston 1452 from an upper position to a lower position via the compacter actuator 1454 while the collection container 1400 is maintained fixed by the base support 1455. The displacement of the compacter piston 1452 induces a predetermined load on the treated base 230 contained in the collection chamber 1410 to form the cake 240.

In the upper position, the compacter piston 1452 is located above the second end 1314 of the bed 1310 while in the lower position the compacter piston 1452 is inserted inside the collection chamber 1410 and located at a predetermined compacting distance d from the enclosure 1414 of the collection chamber 1410. The predetermined compacting distance d may be adjusted depending on the quantity of the personalized cosmetic composition 200 and/or a compactness of the cake 240.

In addition, a porous layer 1453 configured to absorb excess liquid present in the collection chamber 1410 by capillarity may be provided on the lower surface 14521 of the compacter piston 1452.

The compacter actuator 1454 may be manual, mechanical, hydraulic, electrical, pneumatic, or the combination thereof. For example, the compacter actuator 1454 may include a solenoid, a hydraulic cylinder, a pneumatic cylinder, or a combination thereof. Further, the compacter actuator 1454 may be manually controlled or automatically controlled via software instructions performed by the circuitry 3000.

Figure 5A:
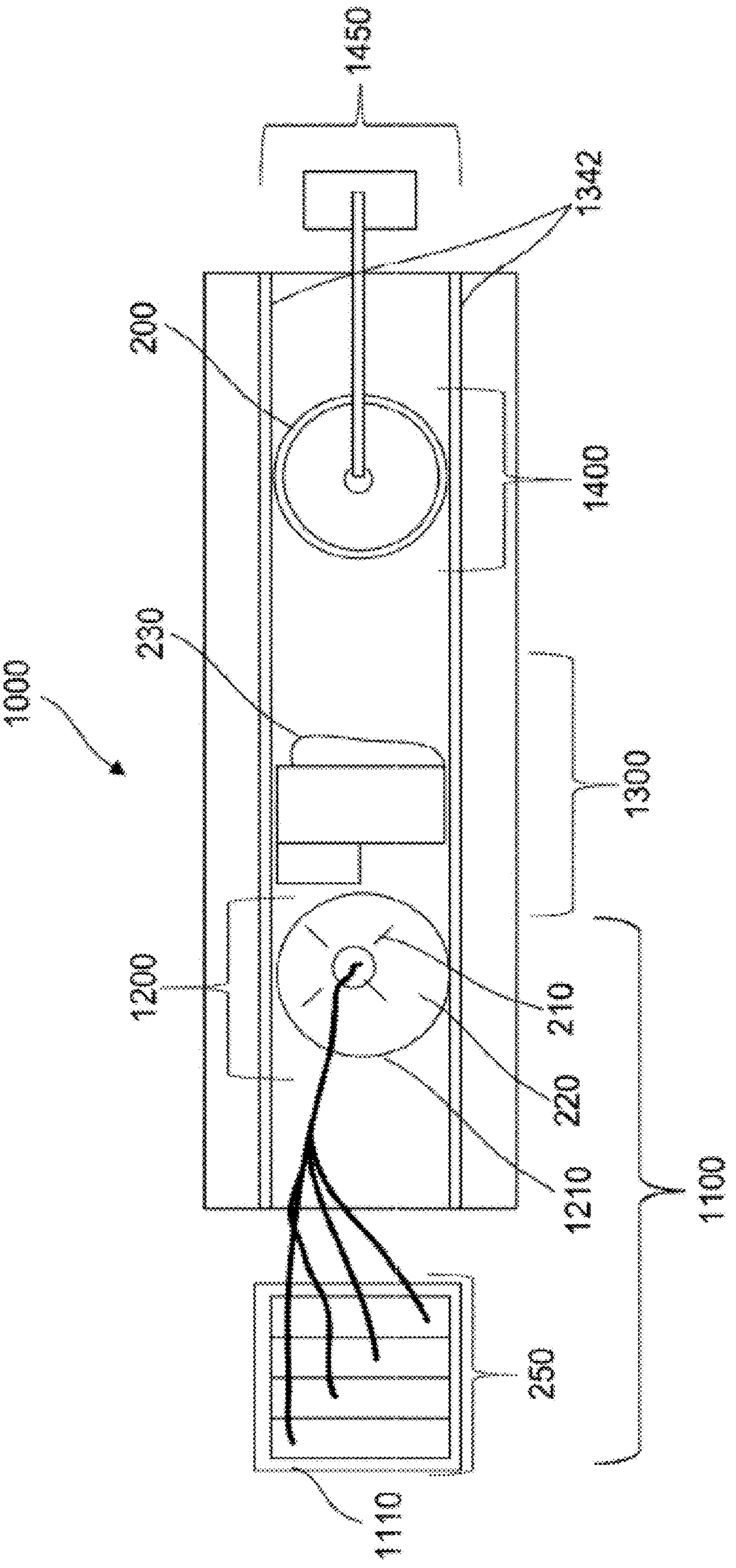
FIG. 5A is a top view of an apparatus to realize a personalized cosmetic composition, according to certain aspects of the disclosure.
Figure 5B:
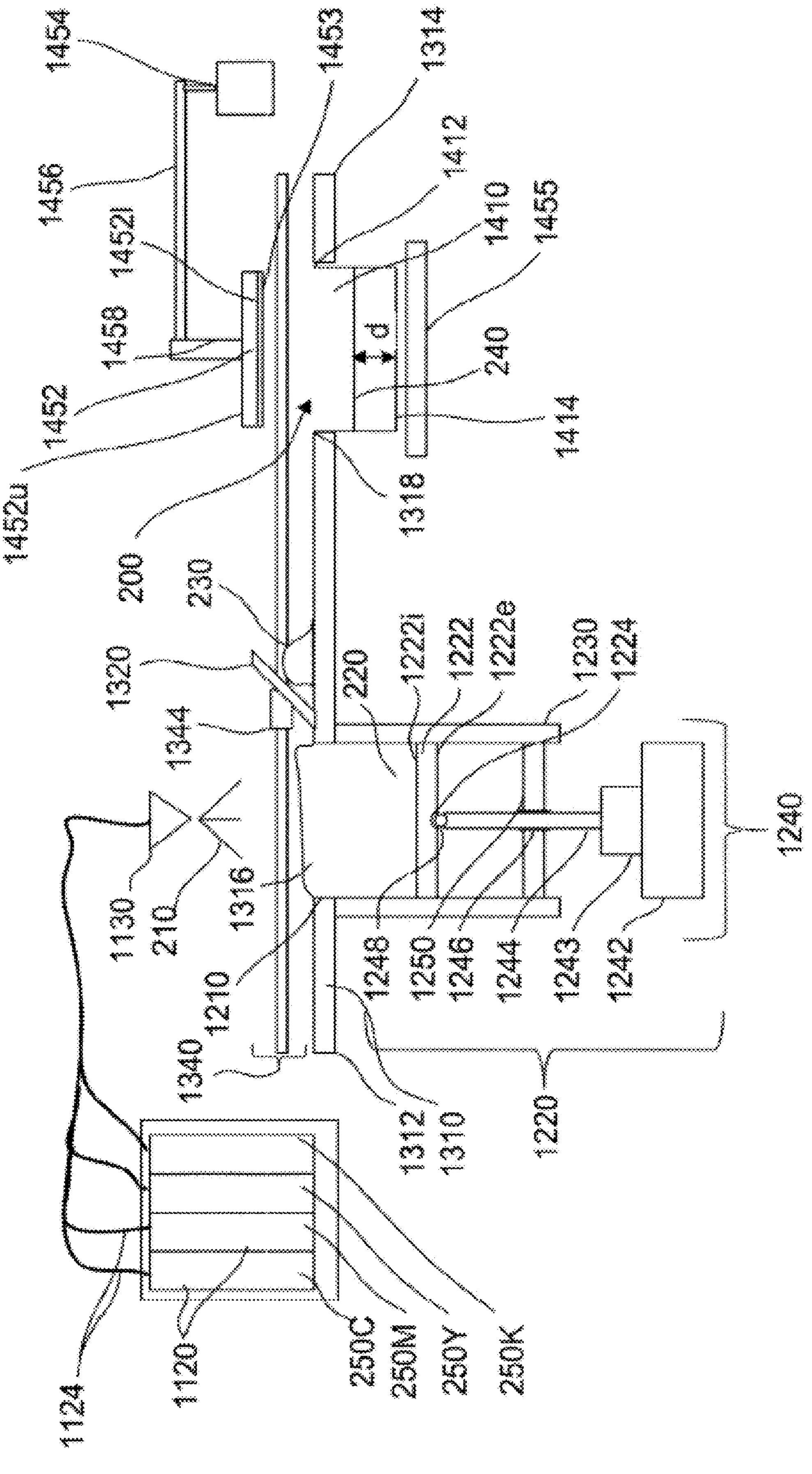
FIG. 5B is a cross sectional view of an apparatus to realize a personalized cosmetic composition, according to certain aspects of the disclosure.

A more complete description of the device shown in FIGS. 5A-5B can be found in U.S. Pat. No. 9,918,538 which is incorporated herein by reference.

Rather than reinventing the entire manufacturing process, the five core powder manufacturing processes were analyzed. Of the five processes, three were seriously considered for the basis of the eyeshadow printer: 90/10, 60/40, and the wet powder processes.

90 Solid:10 Binder (90/10) Technology

Arguably the oldest and most prevalent of the powder technologies, 90/10 produces a hard powder cake that is typically more powdery in texture than the other technologies. Because the mixture is primarily solids, it is easily dosed using mass balance and Archimedes screw-controlled hoppers.

Unfortunately, because it is primarily powders, the risk of loose powder contaminating the rest of the printer was extremely high. While pre-adding the binders reduced the risk of loose powder contamination, it also proved challenging to mix: vibrational methods caused the powders to clump, resulting in uneven mixing, physical objects (such as blender blades) mixed the powder well but are difficult to automatically clean between batches and ensure no batch-to-batch contamination.

60 Solid:40 Binder (60/40) Technology

Unlike 90/10 which produces a hard, powdery cake, 60/40 produces an intense, soft, and creamy cake. This is primarily attributed to increased binder in the mixture as well as the addition of a styrene-ethylene/butylene styrene block copolymer (Krayton). The consistency of the 60/40 mixture is dough-like paste, lending itself to be mixed in a variety of fashions ranging from kneading (the conventional mixing method), to roller mixing, and even vibrational methods The primary challenge for adapting 60/40 technology is the potential dosing mechanism inaccuracy. Being a liquidly paste, dosing mechanisms such as syringe pumps and valve-less rotary pumps were considered. However, the rheology of the paste led to dosing inaccuracies of up to 30%. This will be further elucidated in the following sections.

Wet Powder Technology

Similar in composition to 90/10, the wet powder process creates a cake that is hard but has a silky texture. This is achieved by adding an additional solvent (isodocecane) to the mixture which is later removed when after forming the cake with an additional heat treatment process (conventionally by baking the eyeshadow at 45° C. overnight).

While the wet powder technology is entirely implementable in the eyeshadow printer, this concept was not fully explored because replicating the overnight bake in an accelerated fashion was determined to be suboptimal. A secondary concern with the wet powder process is the amount of volatile organic compounds (VOCs) produced by the process may result in safety issues when implemented in a retail (non-factory) space.

Initial Technology Selection

Because both 90/10 and 60/40 had their advantages in implementation for the eyeshadow printer, development on adapting both technologies for the printer was run in parallel.

Process Development & Optimization

The printer's eyeshadow process can be broken down into separate modules: storage containers for the eyeshadow ingredients, dosing mechanisms, mixing mechanism, cake compressions, and mixture transfer process.

Storage Containers

Several container designs may be utilized. These containers included piston pump tubes similar to caulking tubes, medical syringes, sealed powder hoppers, and even single-packaged pastes similar to condiment packages. Ultimately the final decision for storage container design was strongly influenced by the dosing mechanism because certain containers work better with each dosing mechanism.

Dosing Mechanism

Design decisions for the dosing mechanism can be categorized by the initial starting technology: for 90/10 powders, miniaturized powder hoppers similar to ones used in robotic pharmaceutical equipment and for the 60/40 mixture, pumps capable of handling liquid and slurries were investigated.

Archimedes Screw Powder Dispensers

These dispensers use a screw-drive connected to a stepper motor to deliver quantized amount amounts of material. However, because powders are prone to fluffing and trapping air, these types of dispensers often need to be paired with a gravimetric measurement sensor to determine the precise amount of material delivered.

Valve-Less Piston Pumps

Figure 7:
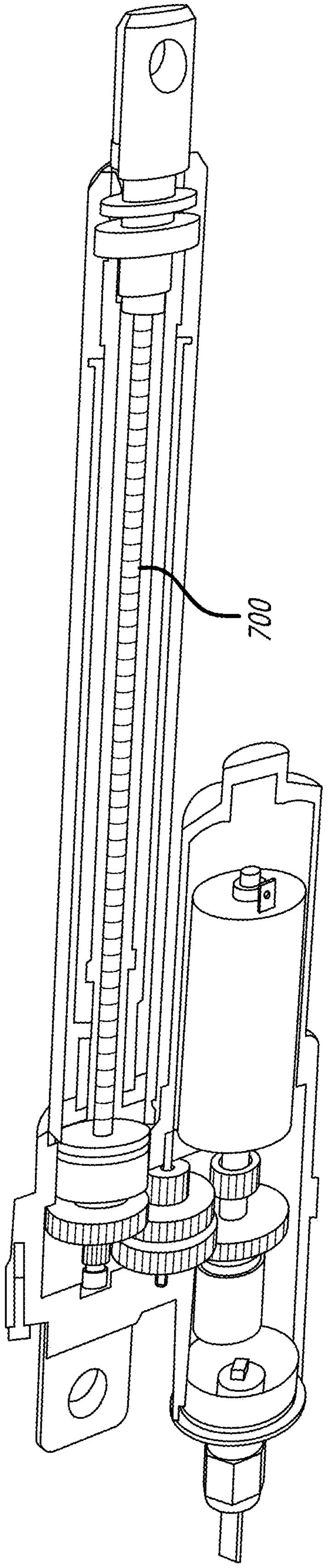
FIG. 7 shows an electric linear actuator.

A piston pump as shown in FIG. 7 with the advantage that it does not need an additional value to function properly to pump slurries and liquids. This design had several advantages as it had very few moving parts and required very little maintenance. The pump volume was determined by the piston's stroked length and also functioned in quantized values.

Clay Extruders

Figure 8:
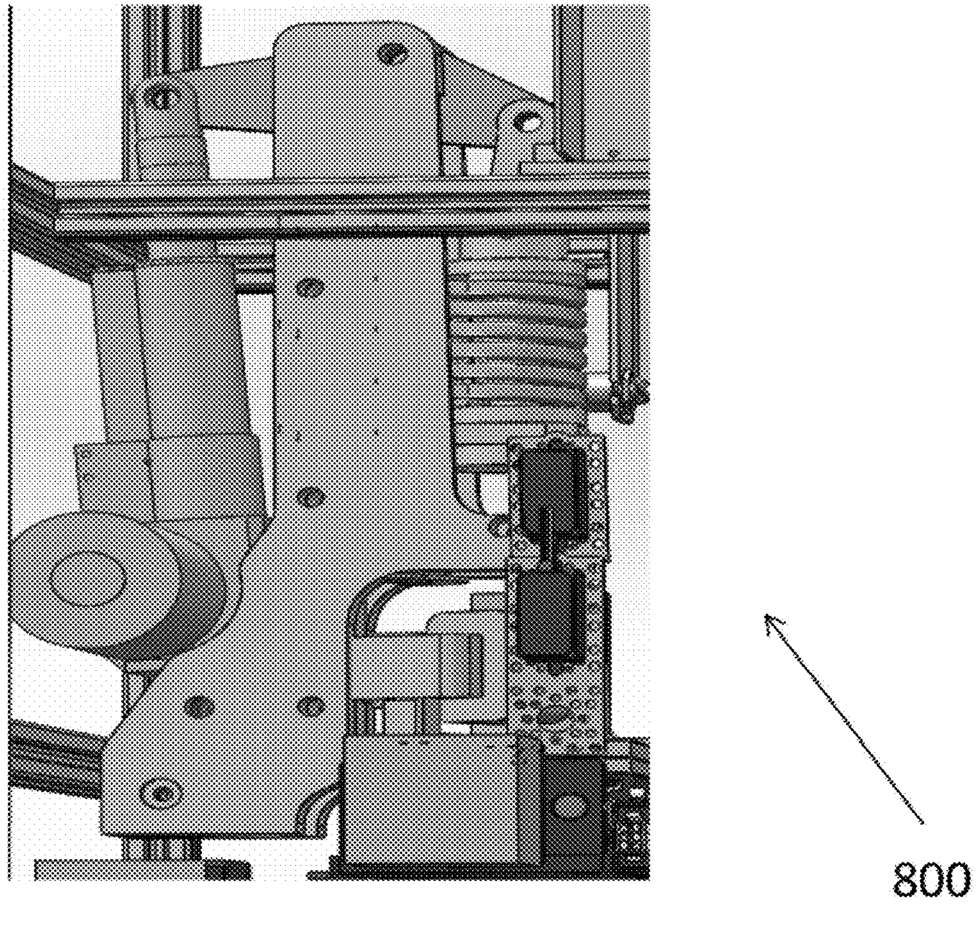
FIG. 8 shows an actuator with a pivoting lever piston.

One of the earliest dispensers explored, the clay extruder shown in FIGS. 8A and 8B was used to evaluate whether it is possible to use a stepper piston to extrude the eyeshadow pastes out of small orifices. While it quickly demonstrated that it was feasible, there was difficulty controlling the amount dispensed as well as controlling the cutoff point of the eyeshadow paste.

Syringe Pumps

Used in several lab benchtop settings for microfluidics, syringe pumps are displacement pumps that actuate the syringe piston in at a consistent rate to pump liquids and slurries. While the actuating mechanism is simple and low maintenance, there are a few caveats using this style of pump with eyeshadow slurries. Because syringes use a linear piston to push their contents, syringe pumps innately need to accommodate at least twice the syringe length.

Mixing Mechanism

Initially, all mixing methods explored contained a type of disposable packaging to prevent the eyeshadow mixture from contaminating the mixer module as well as other parts of the printer. In the end, it was determined that a reusable isolation material was feasible.

Vibrational Powder Mixing

For powder processing, vibrational methods were attempted to avoid having mixer blades (disposable or reusable) making contact with the eyeshadow mixtures. While it proved feasible to mix the powders with off-axes vibration and frequency sweeping, the mixture often clumped together and resulted in uneven dispersal of the colorants and inhomogeneity. In order to properly mix the 90/10 mixtures with vibrations, specific frequency sweeps were required to break up the clumps and redistribute the colorants. Unfortunately, these frequency sweeps were highly formulation dependent and in the 3-month time period provided, this frequency optimization was determined to be an inefficient usage of time and ultimately abandoned.

Roller Mixing

For the eyeshadow pastes and slurries, one of the early forerunners for mixing was using disposable plastic containers. The rollers would deform the container, kneading the eyeshadow to obtain homogeneity. As this design evolved, the plastic container changed from a cylindrical bulb to flat plastic tubing that would be heat sealed to contain the powders.

The major challenge with the roller mixing concept was actually not the execution of the roller mixer, but rather the implementation of transferring the tubing between the various processing stages of filling with eyeshadow, mixing, and dispensing into the metal pan for compaction. Originally, a 3-way track was proposed to route the tubing between modules, however this was never fully implemented as a more elegant solution was discovered just prior to this module being built.

Vibrational Paste Mixing

It was discovered that microvortexers operate at frequencies that liquefy some of the binder formulations used in eyeshadows, allowing for homogenous pastes with less than two minutes of mixing inside the eyeshadow pan. Because mixing was done in the final container instead of an intermediary container, this mixing method quickly became the forerunner of the mixing technologies.

Figure 6:
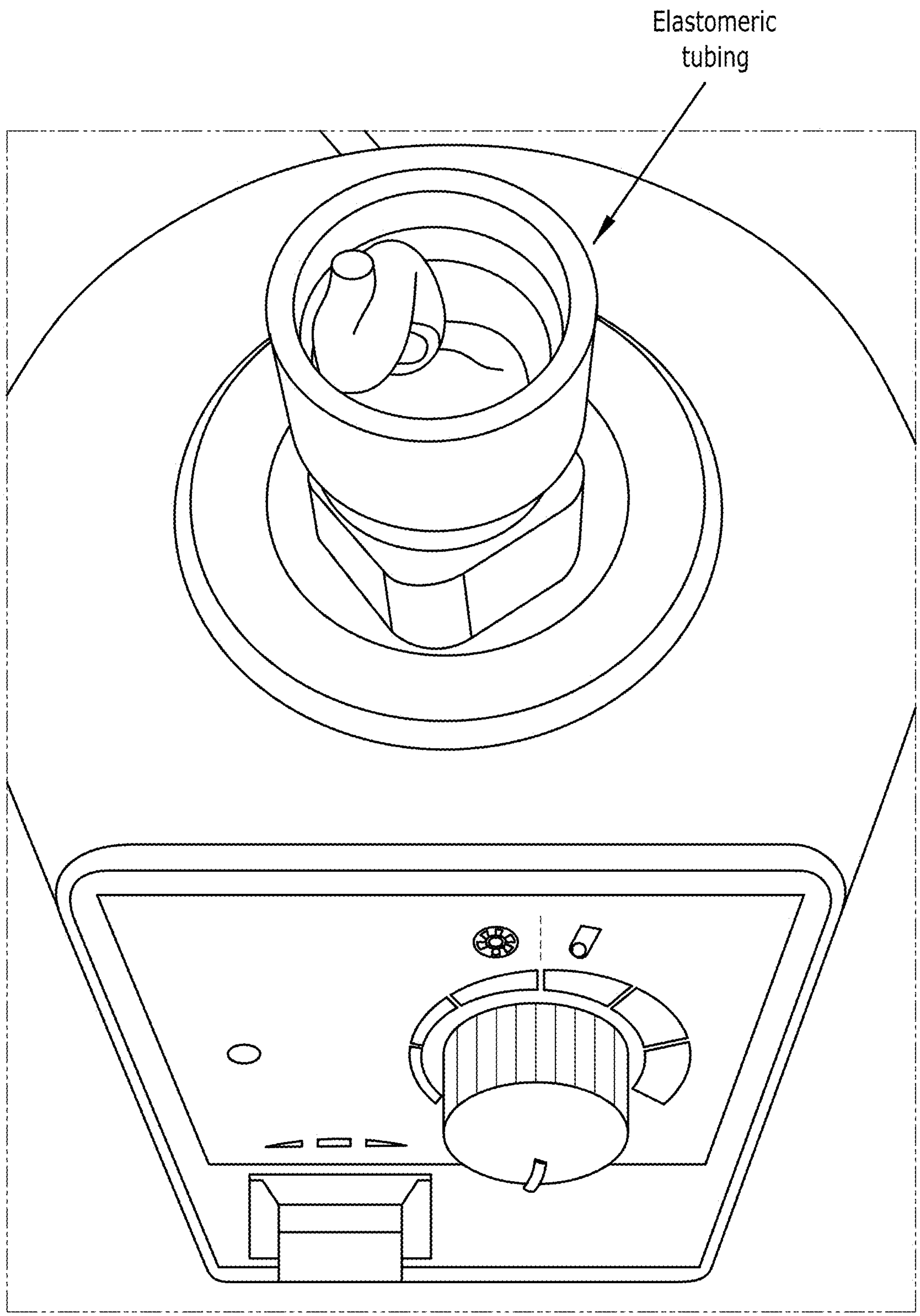
FIG. 6 shows a tight-fitting elastomeric tube shown according to one embodiment.

To prevent the pastes from escaping the pan while mixing, a tight-fitting elastomeric tube shown in FIG. 6 is placed around the metal pan, effectively increasing the pan's wall height. Because of the elastomeric nature of the tube and its relative tightness around the pan, the tube effectively cleans itself during the compression step, which also eliminates the necessity of any cleaning. In the implemented embodiment, the elastomeric tubing was replaced with a tight fitting stainless steel collar to avoid incompatibilities between the elastomeric rubber and the eyeshadow ingredients.

Interestingly, the viscosity of the 60/40's binder is slightly higher than the 90/10's binder. This results in less optimal mixing as the binder "gels up" at the frequency that the vortexer operates at instead of liquefying. It was decided to use the 90/10's binder for the phase 1 deadline and further optimize the binder-vibrational mixing in subsequent phases. This increase in viscosity is believed to be attributed to the addition of 6% Krayton, which unfortunately is also likely imparts some of the tactile, smooth feel that the 60/40 eyeshadows have.

Cake Compression

Cake compression is achieved by an electric linear actuator 700 shown in FIG. 7. Originally the project was scoped to use 90/10 materials only, which requires a compression pressure between 500-1000 PSI. As such the actuator was rather large (approximately 0.5 m). Since 60/40 materials require a compression pressure between 200-500 PSI, a smaller actuator (approximately 0.2 m) can be used with a pivoting lever piston 800 shown in FIG. 8 to achieve a maximum compaction pressure of 800 PSI. In all cases, a layer of silk or cosmetic sponge is used as a barrier between the piston and eyeshadow to prevent contamination.

Material Transfer Process

Transferring eyeshadow between the other modules made several evolutions as the eyeshadow process itself changed. Initially the pan was on a pivoting arm, eyeshadow was dispensed into an intermediary mixing chamber, the homogenized eyeshadow was squeezed into the pan, and then the pan is pivoted onto the compression piston to finish the cake. This eventually was refined to using flat tubing through a 3-way router (fill, mix, dispense into pan) followed by the cake compression. The most recent evolution consists of the microvortexer mounted to a XY-stage moving the pan between the various eyeshadow ingredients (colors, base, & pearls), mixing the eye shadow with the vortexer, and finished by compressing the cake.

Final Phase 1 Printer Specifications

Figure 9:
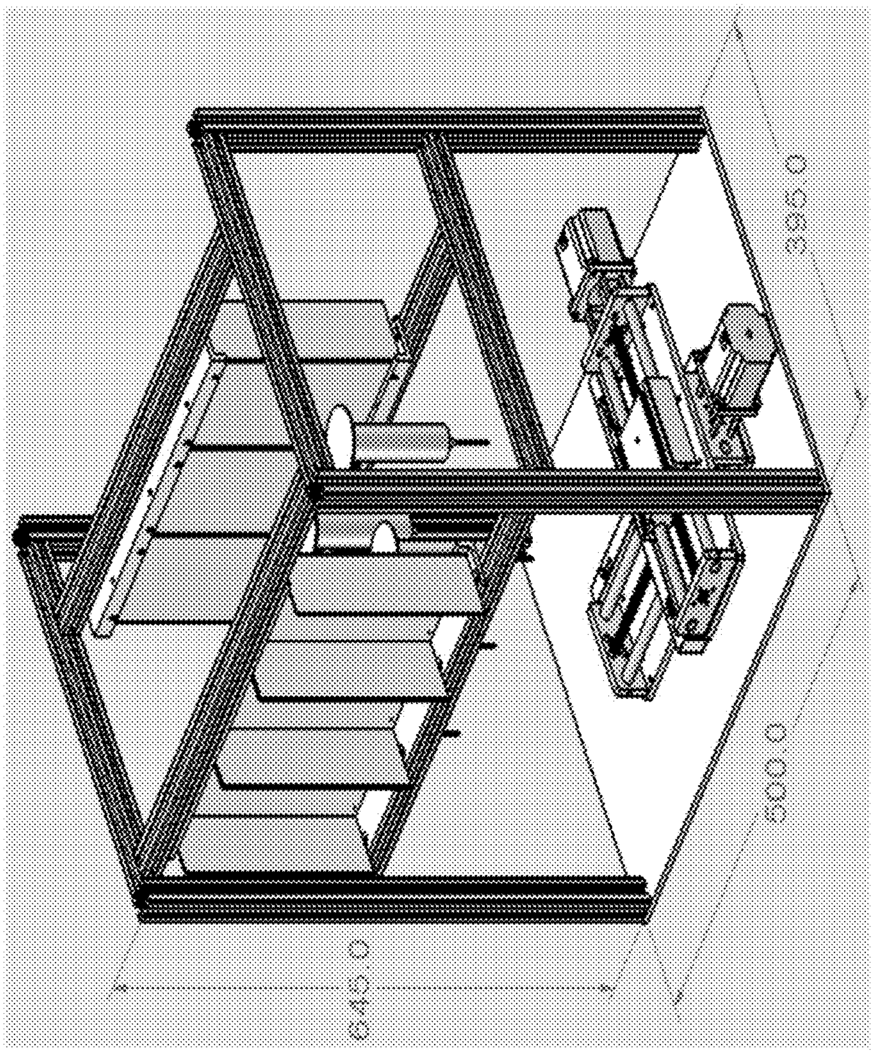
FIG. 9 shows the printer's form factor according to one embodiment.

FIG. 9 shows the printer's form factor according to one embodiment. Taking everything into consideration, the following mechanisms were used in this embodiment, note that steps 3-7 are all automated and controlled by software:

1. The eyeshadow ingredients were filled 60% solid and 40% liquid into plastic 500 mL (base) and 100 mL (colorants & pearls) syringes using the solid ingredients from the 60/40 technology and the liquid ingredients of the 90/10 technology. Dosing is achieved via syringe pumps.
2. An eyeshadow pan is manually loaded into the printer.
3. Using a physically mounted computer (Surface 3) and LabVIEW software, predetermined amounts of the colorants, pearls, and base are dispensed into the pan
4. Once all the ingredients are dispensed, the ingredients are automatically mixed via the AC vortxer (controlled by computer's software).
5. After mixing, the pan is automatically docked to the compression piston
6. A cosmetic sponge is automatically placed on top of the pan and the piston compresses the eyeshadow into a cake.
7. The pan is returned to the original position where it was first inserted into the printer.
8. The cosmetic sponge is removed and disposed of; pan is unloaded from the printer and placed into the more substantial plastic packaging.

The physical input into the printer is a metal eyeshadow pan. The outputs of the printer are an eyeshadow cake in metal pan and a cosmetic sponge (waste). Occasional maintenance of the printer includes replacing the prefilled eyeshadow syringes and refilling the stack of cosmetic sponges.

Physical dimensions of the printer are not limited to what is shown in FIG. 9 and can be potentially shrunk.

Dosing Mechanism

Figure 10B:
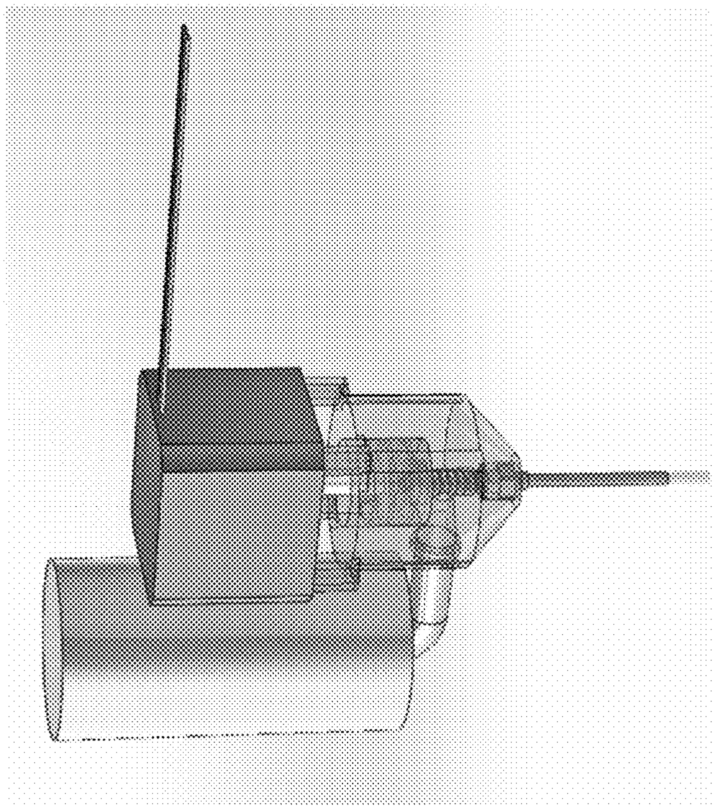
FIGS. 10A and 10B show a screw pump for pastes.
Figure 10A:
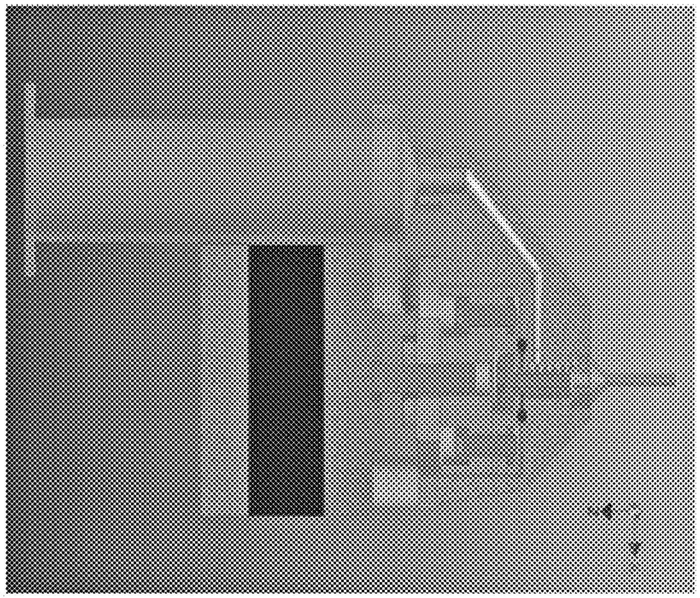

As mentioned previously, syringe pumps had an inherent inaccuracy with the eyeshadow mixture due to the energy stored within the mixture during compression. To compensate for this, a screw pump for pastes may be used as shown in FIGS. 10A and 10B. These types of pumps are used in automated solder paste (for electronics assembly, etc.) printers and utilize the screw for accurate dosing while an actuated reservoir primes the screw pump.

Actuation method for the reservoir may include dead weights, spring pistons, and compressed air are being considered.

Auto Pan Loader & Output Drawer

One factor to consider was that an operator was required to put their hand into the machine to set the pan before. In an alternative embodiment, a design for an auto pan loading mechanism may be used; making manual pan loading and having an operator insert their hand into the device unnecessary.

Figure 11:
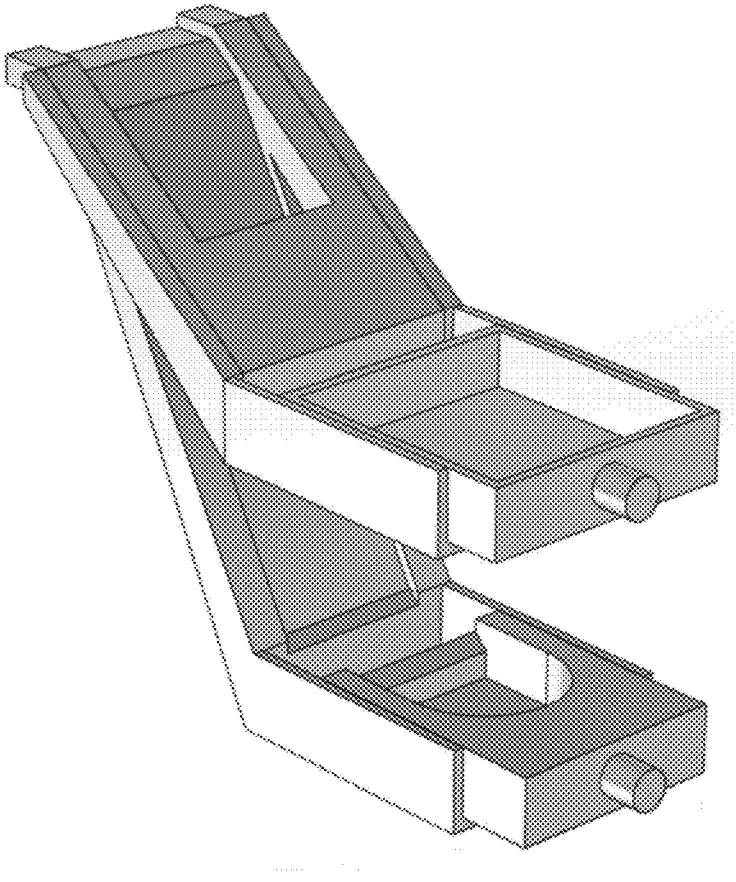
FIG. 11 shows a pan loader and output drawer.

In addition to the pan loader, an output drawer shown in FIG. 11 has also been proposed to eliminate the operator from inserting their hand into the device after the printing has finished. The output drawer also automatically separates the sponge from the pan, allowing for some potentially automated disposal configurations.

The addition of the pan loader and output drawer enable a queueing system for the device, thus allowing for multiple eyeshadow print jobs to be entered simultaneously while only having a single device.

Form Factor

Several form factors have been proposed with a primary focus on the retail spaces the device may be used in. All the proposed form factors are using a spring-actuated reservoir to prime the screw pumps which adds additional height to the machine. Other actuation mechanisms may not add as much height.

Figure 12B:
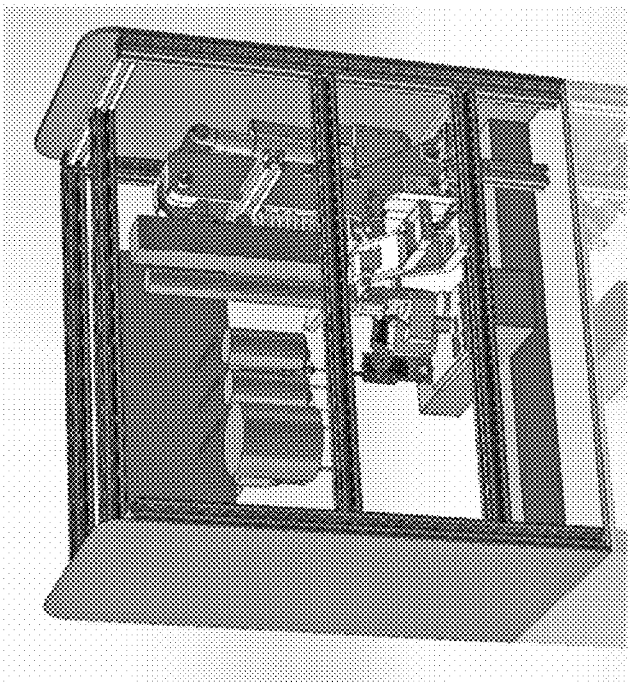
FIGS. 12A and 12B show one form factor of the printer according to an embodiment.
Figure 12A:
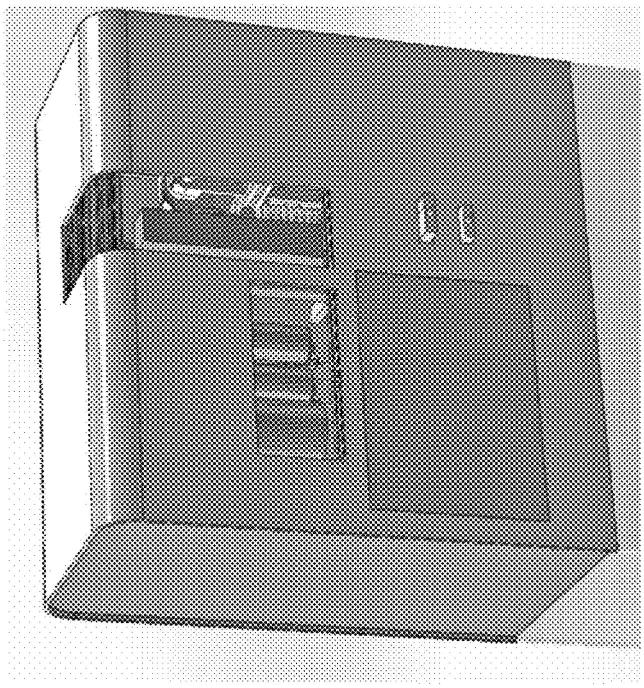

Form 1:

FIGS. 12A and 12B show one form factor according to an embodiment. This design primarily focuses on replacing the dosing mechanisms, incorporating the automatic loader/output drawer, and optimizing space management.

In this configuration, it is conceivable to change the size to 610 mm×318 mm×590 mm (w×d×h). The reduction of depth allows for the device to be used in wall-door retail spaces (artificial walls with shelves) where the depth of the device is extremely limited. Primary drawback for this design is the need for back panel access to replace some of the eyeshadow cartridges. Also, the depth of the machine might still be too large to fit into specific wall-door form factors.

Form 2: Linear Pump Concept

Figure 13B:
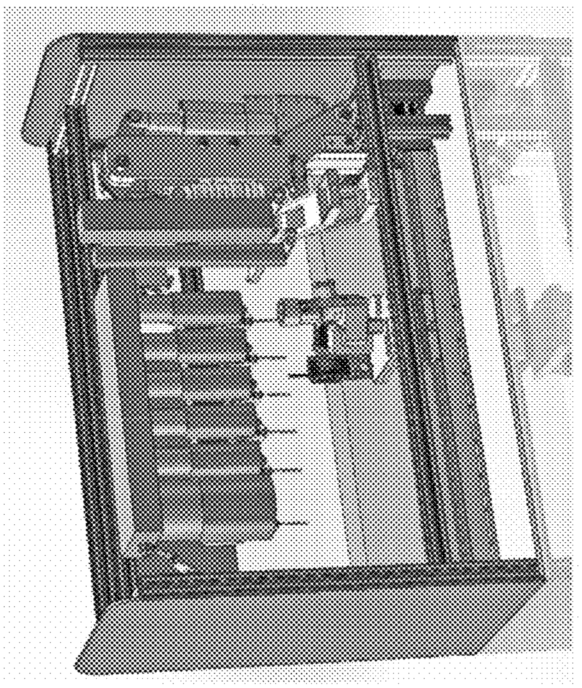
FIGS. 13A and 13B show an embodiment with a linear pump design as another form factor.
Figure 13A:
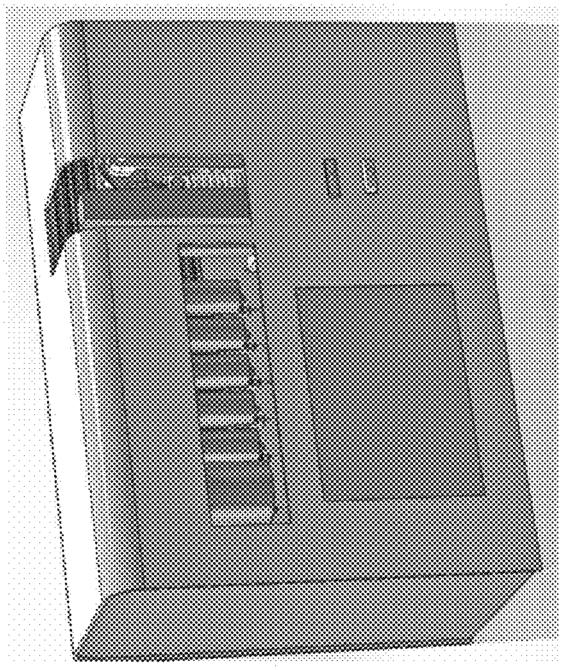

Unlike the alpha build which utilizes a two-axis stage to move the pan under the dispensers, the linear pump design shown in FIGS. 13A and 13B sets all the pumps in a row. This eliminates 1 axis, reducing part costs as well as further reducing the depth of the device. The proposed dimensions are: 765 mm×310 mm×550 mm (w×d×h).

Form 3: Semicircle Concept

Figure 14B:
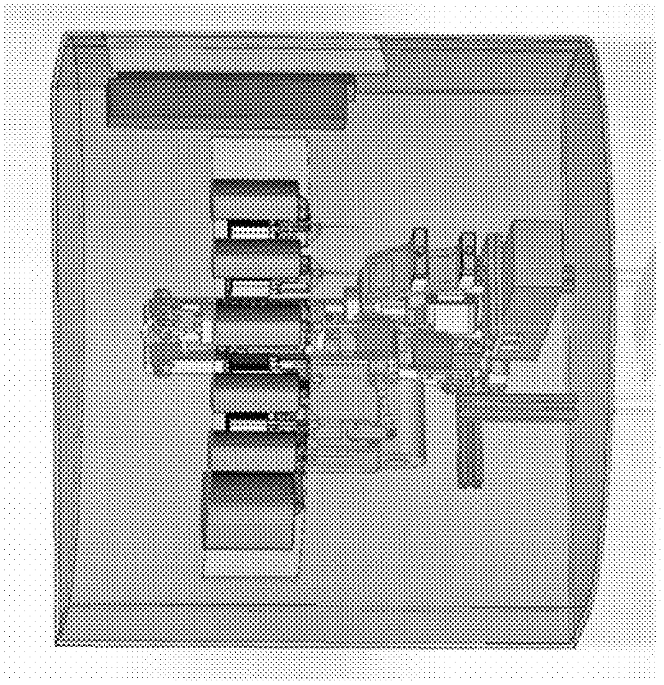
FIGS. 14A and 14B show an embodiment with a semi-circle design as another form factor.
Figure 14A:
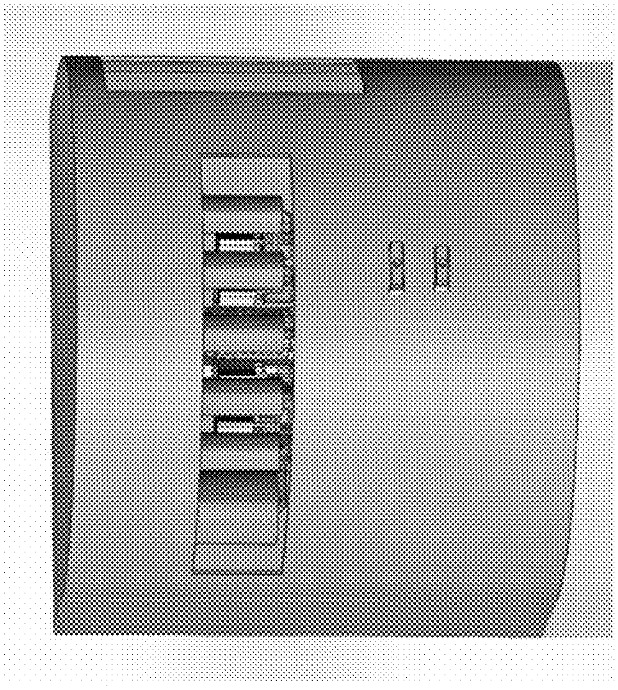

Similar to the linear pump, the pumps are placed radially around the device's center, requiring only a single parameter manipulation (polar instead of Cartesian). The semicircle concept shown in FIGS. 14A and 14B has many of the advantages of the linear concept, but instead of shallow depth & long width, the footprint is more uniform: 620 mm×490 mm×560 mm (w×d×h).

Figure 15:
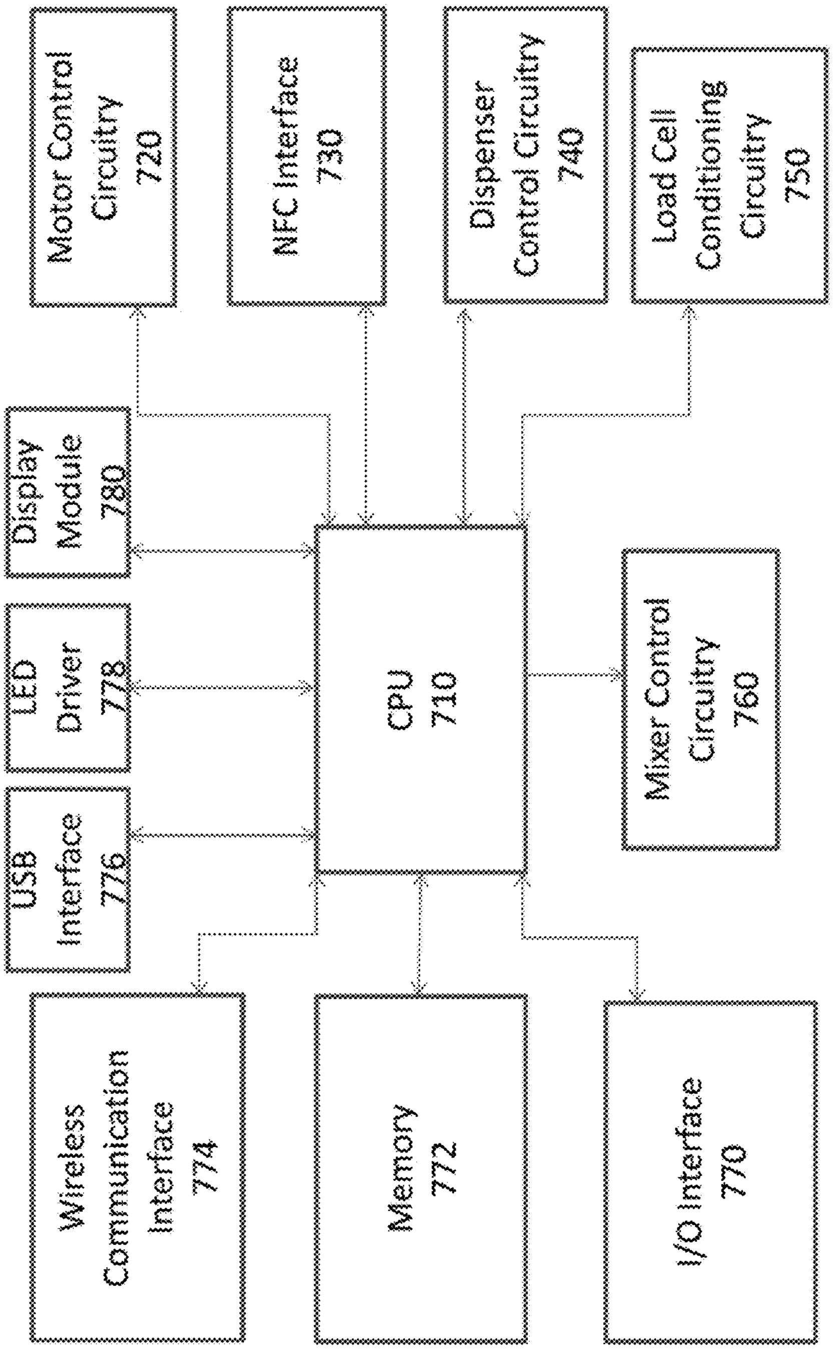
FIG. 15 shows a block diagram of the hardware included in the printer apparatus.

FIG. 15 shows a block diagram of the hardware included in the printer apparatus described above. A central processing unit (CPU) 710 provides primary control over the separate circuitry components included in the apparatus, such as the motor control circuitry 720 (where applicable), the NFC Interface 730, the dispenser control circuitry 740 (which includes the dispensing motor control circuitry and the inductive sensor circuitry), the load cell conditioning circuitry 750, the mixer control circuitry 760. The CPU 710 also controls an optional input/output device (such as a keyboard or mouse), a memory 780, the wireless communication interface circuitry 774, a universal serial bus (USB) controller 776, a LED driver 778, and a display module 780. The LED driver controls the pulsing of one or more LEDs that illuminate the container holder 152.

In an embodiment, circuitry includes, among other things, one or more computing devices such as a processor (e.g., a microprocessor, a quantum processor, qubit processor, etc.), a central processing unit (CPU), a digital signal processor (DSP), an application-specific integrated circuit (ASIC), a field programmable gate array (FPGA), or the like, or any combinations thereof, and can include discrete digital or analog circuit elements or electronics, or combinations thereof. In an embodiment, a module includes one or more ASICs having a plurality of predefined logic components. In an embodiment, a module includes one or more FPGAs, each having a plurality of programmable logic components.

In an embodiment, circuitry includes one or more components operably coupled (e.g., communicatively, electromagnetically, magnetically, ultrasonically, optically, inductively, electrically, capacitively coupled, wirelessly coupled, or the like) to each other. In an embodiment, circuitry includes one or more remotely located components. In an embodiment, remotely located components are operably coupled, for example, via wireless communication. In an embodiment, remotely located components are operably coupled, for example, via one or more communication modules, receivers, transmitters, transceivers, or the like.

In an embodiment, any of the CPU 710 or other components shown in FIG. 15 may be substituted with alternative circuitry elements. Examples of circuitry includes memory that, for example, stores instructions or information. Non-limiting examples of memory include volatile memory (e.g., Random Access Memory (RAM), Dynamic Random Access Memory (DRAM), or the like), non-volatile memory (e.g., Read-Only Memory (ROM), Electrically Erasable Programmable Read-Only Memory (EEPROM), Compact Disc Read-Only Memory (CD-ROM), or the like), persistent memory, or the like. Further non-limiting examples of memory include Erasable Programmable Read-Only Memory (EPROM), flash memory, or the like. In an embodiment, memory is coupled to, for example, one or more computing devices by one or more instructions, information, or power buses.

In an embodiment, circuitry includes one or more computer-readable media drives, interface sockets, Universal Serial Bus (USB) ports, memory card slots, or the like, and one or more input/output components such as, for example, a graphical user interface, a display, a keyboard, a keypad, a trackball, a joystick, a touch-screen, a mouse, a switch, a dial, or the like, and any other peripheral device. In an embodiment, a module includes one or more user input/output components that are operably coupled to at least one computing device configured to control (electrical, electromechanical, software-implemented, firmware-implemented, or other control, or combinations thereof) at least one parameter associated with, for example, determining one or more tissue thermal properties responsive to detected shifts in turn-ON voltage.

In an embodiment, circuitry includes a computer-readable media drive or memory slot that is configured to accept signal-bearing medium (e.g., computer-readable memory media, computer-readable recording media, or the like). In an embodiment, a program for causing a system to execute any of the disclosed methods can be stored on, for example, a computer-readable recording medium, a signal-bearing medium, or the like. Non-limiting examples of signal-bearing media include a recordable type medium such as a magnetic tape, floppy disk, a hard disk drive, a Compact Disc (CD), a Digital Video Disk (DVD), Blu-Ray Disc, a digital tape, a computer memory, or the like, as well as transmission type medium such as a digital or an analog communication medium (e.g., a fiber optic cable, a waveguide, a wired communications link, a wireless communication link (e.g., receiver, transmitter, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, or the like.

In an embodiment, circuitry includes acoustic transducers, electroacoustic transducers, electrochemical transducers, electromagnetic transducers, electromechanical transducers, electrostatic transducers, photoelectric transducers, radioacoustic transducers, thermoelectric transducers, or ultrasonic transducers.

In an embodiment, circuitry includes electrical circuitry operably coupled with a transducer (e.g., an actuator, a motor, a piezoelectric crystal, a Micro Electro Mechanical System (MEMS), etc.) In an embodiment, circuitry includes electrical circuitry having at least one discrete electrical circuit, electrical circuitry having at least one integrated circuit, or electrical circuitry having at least one application specific integrated circuit. In an embodiment, circuitry includes electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs.

Figure 16:
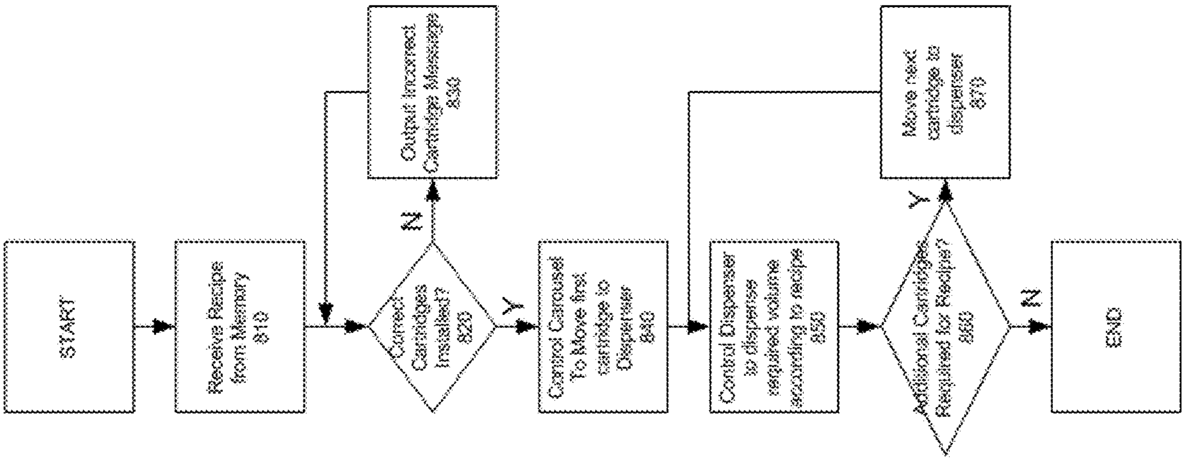
FIG. 16 shows a flowchart of a process or algorithm controlled by the circuitry of the apparatus.

FIG. 16 shows a flowchart of a process or algorithm controlled by the circuitry of the apparatus 100. After the start of the process, at step 810, a recipe is received from memory. At step 820, the circuitry determines if the correct ingredients (cartridges) are installed. If the correct ingredients are inserted, the process moves to step 840, otherwise at step 830 the apparatus outputs a message to the user indicating that the correct cartridges need to be inserted. At step 840, the stage is controlled to move the first ingredient in the recipe to the dispenser. In step 850, the dispenser is controlled to dispense the required volume of the composition in the ingredient according to the recipe. At step 860, the circuitry determines if additional ingredients are required for the recipe. If the determination is “Yes” at 860, then the at step 870, the process proceeds with moving the next ingredient in the recipe to the dispenser and the process proceeds from step 850. If “No” at step 860, the process ends.

Figure 17:
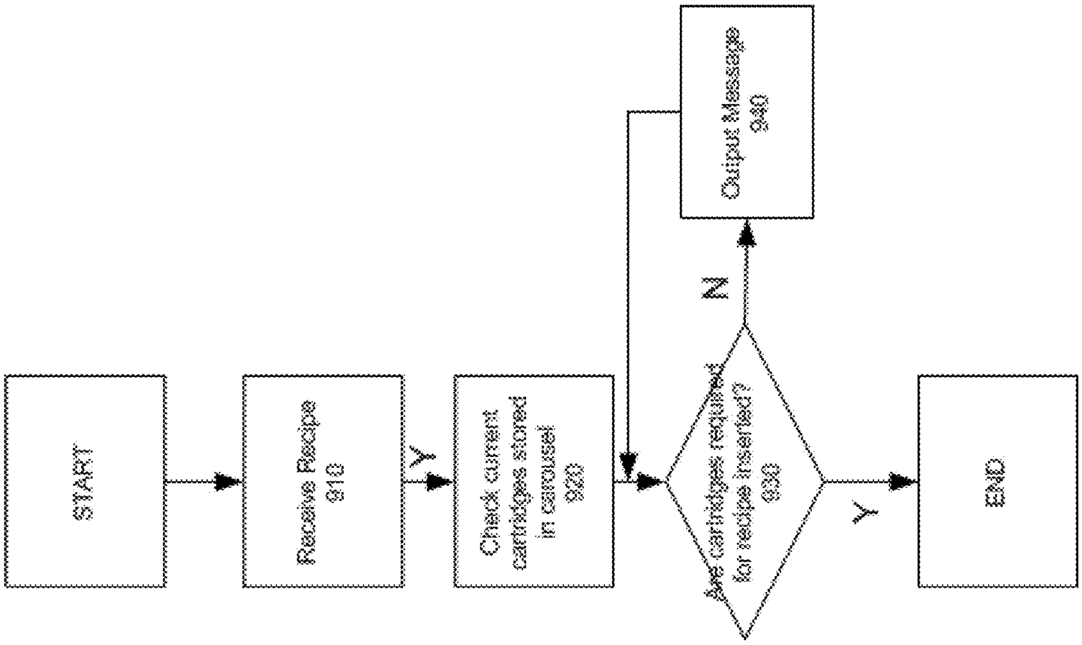
FIG. 17 shows an example of a sub-process or algorithm performed by the circuitry of the apparatus for determining a current set compositions in the apparatus.

FIG. 17 shows an example of a sub-process or algorithm performed by the circuitry of the apparatus 100 for determining a current set compositions in the apparatus 100. At step 910, a recipe is received from memory. At step 920, the circuitry checks the current ingredients stored in the stage (carousel). At step 930, the circuitry determines if the current ingredients stored in the stage include all of the ingredients required for the received recipe. If this determination is “No” then a message is outputted to the user at step 940 to request the user to insert the required ingredients. If the determination is “Yes” then the sub-process ends, and the circuitry will proceed with a process of moving the ingredients to the dispenser.

Figure 18:
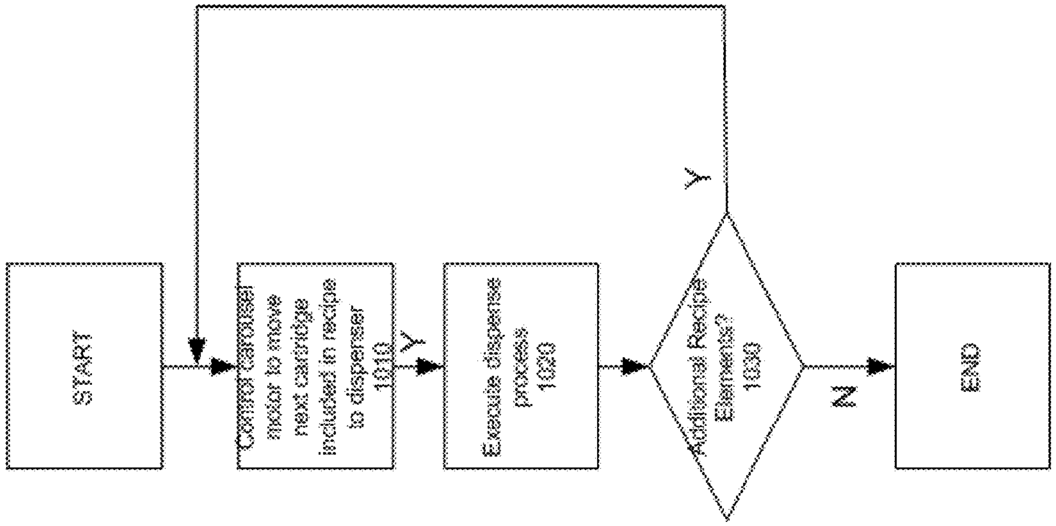
FIG. 18 shows an example of a process or algorithm performed by the circuitry of the apparatus for controlling dispensing as a sub-process of the overall method.

FIG. 18 shows an example of a process or algorithm performed by the circuitry of the apparatus 100 for controlling the stage to move the ingredients to the dispenser as a sub-process of the overall method. At step 1010, the stage is controlled to move a first (or next) ingredient in the recipe to the dispenser. At step 1020, a dispense sub-process (as shown in FIG. 11) is executed. At step 1030, the circuitry determines if additional recipe elements are in the recipe. If this determination is “Yes” then the process repeats at step 1010. If this determination is “No” then the process ends. At this point, the apparatus may output a message to the user indicating that the composition corresponding to the recipe has been completely dispensed into to the container.

Figure 19:
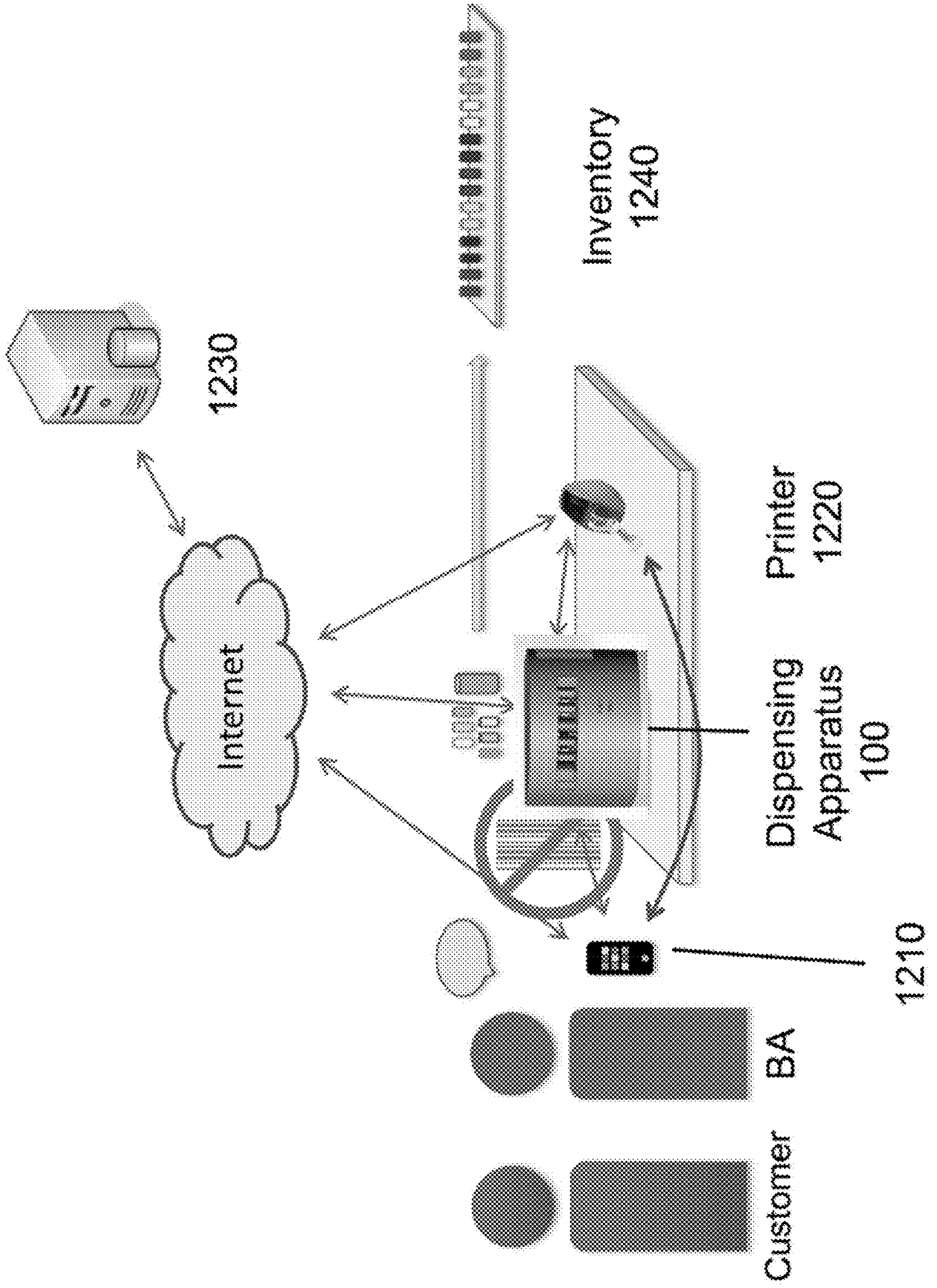
FIG. 19 shows a system which implements the printer apparatus.

FIG. 19 shows a system 1200 which implements the apparatus 100 described above. As shown in FIG. 12, the system includes at least the apparatus 100, an information processing apparatus 1210, and a printer 1220. Optionally, the system may further include one or more external server devices or information processing apparatuses 1230 which are implemented as part of a cloud-computing environment. Furthermore, the system may optionally include inventory 1240 which is an inventory for booster compositions and base compositions to be inserted into the apparatus 100.

The information processing apparatus 1210 may be a personal computer (PC), a laptop computer, a PDA (Personal Digital Assistants), a smart phone, a tablet device, a UMPC (Ultra Mobile Personal Computer), a net-book, or a notebook type personal computer. In the below examples, the information processing apparatus 1210 is assumed to be a tablet device, such as an Apple iPad.

The printer 1220 may be any type of printing device or image forming device as understood in the art which has the capability of printing a label. In the below examples, the printing device is assumed to be a label printer, such as the Wireless Brother PTP750 W.

Each of the information processing apparatus 1210 and the printer 1220 are capable of performing wireless communication with the apparatus 100 by way of the Bluetooth interface on the apparatus 100. However, each of the information processing apparatus 1210 and the printer 1220 are also capable of having a wired connection to the apparatus 100 by way of the USB interface on the apparatus 100. Additionally, each device, including the apparatus 100, may communicate with each other and the external one or more devices through an internet connection via an 802.11 wireless connection to a wireless internet access point, or a physical connection to the internet access point, such as through an Ethernet interface. Each of the information processing apparatus 1210 and the printer 1220 are capable of performing wireless communication with each other through a Bluetooth connection or other wireless means as well.

The information processing apparatus 1210 is configured to receive information about a user for use in generating a recipe that will be used by the apparatus 100 to dispense a composition into the output container. The information processing apparatus 1210 may be operated by a "beauty advisor" (BA) working at the retail store that sells the dispensed composition to the customer user. However, the information processing apparatus 1210 can also be operated directly by the customer user.

Figure 20:
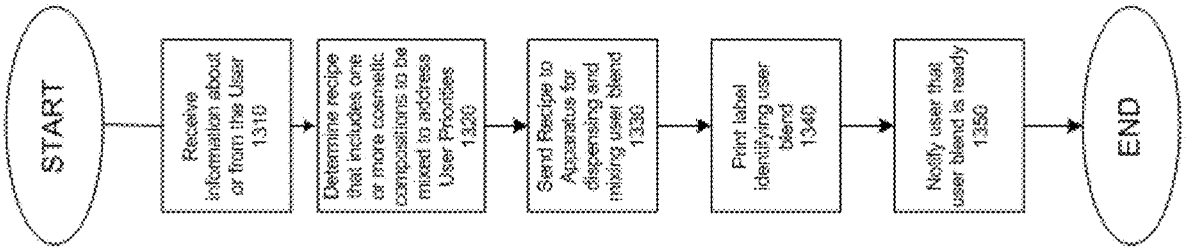
FIG. 20 shows a process performed by the system which implements the printer apparatus.

A process performed by the system 1200 is shown on FIG. 20. In step 1310, the information processing apparatus 1210 receives information, which will be described in more detail below, about or from the user which will be used to determine the recipe for creating the user-specific eye-shadow that will be dispensed into the output container. In step 1320, a recipe is determined that includes one or more cosmetic compositions to be mixed to address the User's priorities. This determination may be performed by the circuitry of the information processing apparatus 1210, but it also may be determined in conjunction with or on another device all together. For instance, the information processing apparatus 1210 may provide the information received in step 1310 to the external server device 1230, and the circuitry of the external server device will determine the recipe. Alternatively, the information may be provided directly to the dispensing apparatus 100 which will determine the recipe. The final determined recipe will be outputted for display on the information processing apparatus 1210. In step 1330, the recipe determined in step 1320 will be provided to the apparatus 1330 over a wired or wireless connection, such as the Bluetooth connection, that exists between the information processing apparatus 1210 and the apparatus. The apparatus 100 will dispense the appropriate compositions according to the recipe into the output container and mix the blended composition as described in detail above. In step 1340, the printer 1220 will receive information on the user identification information and the blended composition in the output container, and will print a label to be placed on the output container accordingly. The printer may receive this information from the apparatus 100, the information processing apparatus 1210, or the external server 1230. In step 1350, the user is notified that the blended composition is completed and ready for pick-up. This notification may come from either the information processing apparatus 1210, the apparatus 100, or the external server 1230, and the notification may be in the form of an e-mail to an e-mail address of the user that is stored in the system, or it could also be in the form of an SMS text message.

In a non-limiting example, the information processing apparatus 1210 is configured to output a series of questions to the user to collect information about the user for generating the recipe. However, alternative embodiments are also available in which the user enters information directly into appropriate fields displayed on the information processing apparatus 1210 without being prompted by displayed questions in order to input the information into the information processing apparatus 1210.

The information processing apparatus 1210 collects biographical information about the user, such as name, age, skin tone, or any other information which may be used to generate a profile of the user. For generating a recipe of the user, a series of questions or fields are presented to the user to generate preferences on types of skin conditions the user would like to address through the composition dispensed by the apparatus 100.

In addition to a questionnaire, an optional skin diagnosis may be performed by a skin diagnosis application as is known in the art.

Based on the responses to these questions, field entries, or skin diagnosis, the information processing apparatus 1210 will generate the recipe of booster and base compositions to be dispensed by the apparatus 100.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed:

1. An apparatus for dispensing a powdered cosmetic composition, comprising:

a dispenser holder configured to hold at least one dispenser that stores a cosmetic composition that is used to make a powdered cosmetic composition;

a container receiving area configured to hold an output container beneath the at least one dispenser;

circuitry configured to determine the cosmetic composition in the at least one dispenser, control the output container to be moved beneath the at least one dispenser, control the dispenser to dispense the cosmetic composition into the output container, and automatically place a cosmetic sponge on the dispensed cosmetic composition in the output container; and a compression piston configured to compress the cosmetic sponge into the output container after the dispensing operation is performed and thereby compress the dispensed cosmetic composition.

2. The apparatus according to claim 1, further comprising a mixer configured to subject the output container to a predetermined movement to cause contents of the output container to mix together.

3. The apparatus according to claim 1, wherein the dispenser holder is configured to hold a plurality of dispensers, each containing a different cosmetic composition.

4. The apparatus according to claim 3, wherein the circuitry is configured to control the output container to be moved one-by-one underneath each of the plurality of dispensers to separately dispense a respective amount of each respective different cosmetic composition into the output container.

5. The apparatus according to claim 4, wherein the circuitry is configured to determine the respective amount of each of the different cosmetic compositions from the multiple dispensers to dispense into the output container based on received external information regarding a particular user.

6. The apparatus according to claim 3, further comprising a two-axis stage to move the output container under the at least one dispenser, wherein the plurality of dispensers are disposed in a row.

7. The apparatus according to claim 3, wherein the plurality of dispensers are disposed radially around a center position of the apparatus.

8. The apparatus according to claim 1, wherein the powdered cosmetic composition is eyeshadow.

9. The apparatus according to claim 1, wherein the at least one dispenser includes a mixture of solid and liquid ingredients.

10. The apparatus according to claim 1, wherein the at least one dispenser is a syringe pump.

11. The apparatus according to claim 1, wherein the at least one dispenser is a screw pump.

12. The apparatus according to claim 1, wherein further comprising an output drawing configured to receive multiple output containers having the powdered cosmetic composition and to hold the output containers external to a housing of the apparatus.

13. The apparatus according to claim 1, wherein the cosmetic sponge forms a barrier between the compression piston and the dispensed cosmetic composition that prevents contamination.

* * * * *